United States Patent [19]

Ebi et al.

[11] 4,437,101

[45] Mar. 13, 1984

[54] INK JET PRINTING APPARATUS

[75] Inventors: Yutaka Ebi; Takao Fukazawa; Toshio Kawakubo; Koichiro Jinnai; Masanori Horike; Kyuhachiro Iwasaki; Chuji Ishikawa; Toshitaka Hirata, all of Tokyo, Japan

[73] Assignee: Ricoh Company, Ltd., Tokyo, Japan

[21] Appl. No.: 374,652

[22] Filed: May 3, 1982

[30] Foreign Application Priority Data

| | | | |
|---|---|---|---|
| May 11, 1981 | [JP] | Japan | 56-70526 |
| May 11, 1981 | [JP] | Japan | 56-70527 |
| May 11, 1981 | [JP] | Japan | 56-70528 |
| May 11, 1981 | [JP] | Japan | 56-70529 |

[51] Int. Cl.$^3$ .................... G01D 15/18

[52] U.S. Cl. .................... 346/75

[58] Field of Search .................... 346/1.1, 75, 140

[56] References Cited

U.S. PATENT DOCUMENTS

| | | | |
|---|---|---|---|
| 3,641,588 | 2/1972 | Metz | 346/75 |
| 3,895,386 | 7/1975 | Keur et al. | 346/1.1 |
| 4,222,059 | 9/1980 | Crean et al. | 346/140 IJ X |
| 4,345,260 | 8/1982 | Deproux | 346/140 IJ X |

*Primary Examiner*—Donald A. Griffin

*Attorney, Agent, or Firm*—David G. Alexander

[57] ABSTRACT

In an ink jet printing apparatus wherein an ink ejection head is loaded on a carriage and, while the carriage moves relative to a sheet of paper, ink droplets are ejected from the head to be charged and deflected to impinge on the sheet of paper, a shape or a position of a conductive member carried on the carriage is varied to develop an electric field which is asymmetrical with respect to a predetermined plane in which charged ink droplets coming out from a charging electrode are to be deflected. The conductive member is constituted by a cover of the carriage, a shield plate, a gutter, a compensating electrode plate, a deflection electrode or the like.

32 Claims, 32 Drawing Figures

INK JET PRINTING APPARATUS

BACKGROUND OF THE INVENTION

The present invention relates to ink jet printing apparatuses and, more particularly, to an improvement in an ink jet printing apparatus of the type wherein an ink ejection head, a charging electrode, a deflection electrode and the like are carried on a carriage and, while the carriage moves relative to a sheet of paper, droplets of ink are ejected from the head to be charged and deflected to impinge on the sheet of paper for reproducing data thereon.

In an ink jet printer of the type described, it is generally observed that an ink droplet to be deflected a relatively large amount is ejected at a timing later than an ink droplet to be deflected a relatively small amount. A droplet of such a large deflection becomes dislocated on the paper sheet relative to a droplet of a small deflection by a same distance as a travel of the carriage which occurs for the time lag. This will result in an inclined or distorted dot pattern on the paper sheet though a vertical dot pattern may be desired, for example. It is therefore desirable to correct the dislocation of a dot or distortion of a dot pattern on a paper sheet originating from a printing movement of the carriage.

SUMMARY OF THE INVENTION

An ink jet printing apparatus embodying the present invention comprises an ink ejection head for ejecting a jet of ink, charging electrode means for electrostatically and selectively charging ink droplets separated from the ink jet, deflection electrode means for electrostatically deflecting the charged ink jet, a carriage for mounting thereon the ink ejection head, charging means and deflection means and moving reciprocatingly along a sheet of paper, and a means for subjecting the charged ink droplets to an electric field which is asymmetrical with respect to a predetermined plane in which the charged ink droplets coming out from the charging electrode means are to be deflected.

In accordance with the present invention, in an ink jet printing apparatus in which an ink ejection head is loaded on a carriage and, while the carriage moves relative to a sheet of paper, ink droplets are ejected from the ink ejection head to be charged and deflected to impinge on the sheet of paper for reproducing data thereon, a shape or a position of a conductive member carried on the carriage is varied to develop an electric field which is asymmetrical with respect to a predetermined plane in which charged ink droplets coming out from a charging electrode are to be deflected. The conductive member is constituted by a cover of the carriage, a shield plate, a gutter, a compensating electrode plate, a deflection electrode or the like.

It is therefore an object of the present invention to correct a dislocation of a dot or inclination of a dot pattern on a paper sheet attributable to a printing movement of the carriage.

It is another object of the present invention to eliminate the dislocation or inclination for both large and small characters to be printed out.

It is another object of the present invention to provide a generally improved ink jet printing apparatus.

Other objects, together with the foregoing, are attained in the embodiments described in the following description and illustrated in the accompanying drawing.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
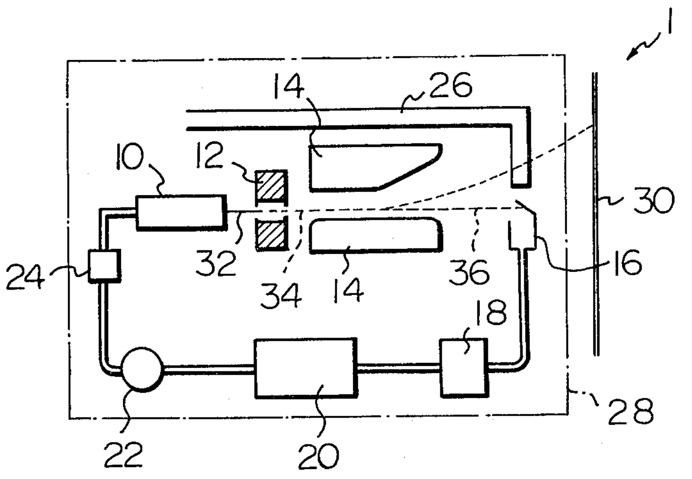
FIG. 1 is a fragmentary view of an ink jet printing apparatus to which the present invention is applicable.

Referring to FIG. 1 of the drawing, an ink jet printing apparatus to which the present invention is applicable is shown and generally designated by the reference numeral 1. The printer 1 includes an ink ejection head 10, a charging electrode 12, a deflection electrode 14, a gutter 16, an ink reservoir 18, a pump 20, an accumulator 22, a filter 24 and a cover 26, all of which are loaded on a carriage 28. As well known in the art, the carriage 28 is movable transverse to a sheet of paper 30, i.e., perpendicular to the drawing sheet. While the carriage 28 is so moved, a jet of ink 32 ejected from the head 10 is separated into a string of ink droplets 34 by the charging electrode 12. The ink droplets 34, at the same time, are selectively deposited with electrostatic charges which correspond to a print data signal. The charged ink droplets 34 are deflected by the deflection electrode 14 each by an amount proportional to its electrostatic charge, impinging on the paper sheet 30 to print out data thereon. Unnecessary non-charged ink droplets 36 are collected by the gutter 16 and returned to the reservoir 18 for repeated use.

Figure 2:
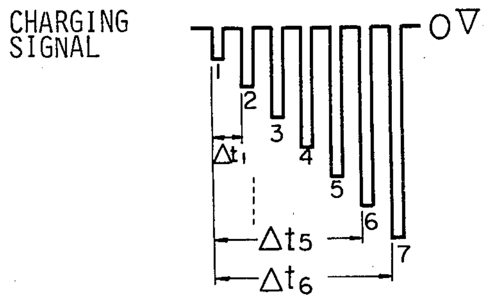
FIG. 2 shows a waveform of a charging signal.
Figure 3:
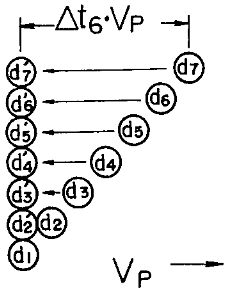
FIG. 3 is a view explanatory of dot patterns printed out on a sheet of paper.

As previously discussed, the printer 1 of the above construction causes an ink droplet of a relatively large deflection amount to be ejected at a timing later than an ink droplet of a relatively small deflection amount, so that the former becomes dislocated relative to the latter on the paper sheet 30 by a distance which the carriage 28 moves for the time lag. Suppose that the printer has seven successive steps of deflection as shown in FIGS. 2 and 3. As represented by a charge signal waveform of FIG. 2, a time lag $\Delta t_6$ exists between the instant of ejection of the first step ink droplet and the instant of ejection of the seventh step ink droplet. Then, as shown in FIG. 3, the dislocation of a dot on the paper sheet 30 formed by the seventh step ink droplet from that formed by the first step ink droplet is expressed as $$\Delta t_6 \cdot V_p$$

where $V_p$ indicates a velocity of movement of the carriage 28. The result is an inclined pattern of dots $d_1$–$d_7$ on the paper sheet 30. Such a dislocation can be compensated to print out a vertically aligned dot pattern on the paper sheet 30 if, as shown in FIG. 3, the seventh ink droplet $d_7$ is deflected to a position $d_7'$ by a distance $\Delta t_6 \cdot V_p$ relative to the first step ink droplet $d_1$ in the direction opposite to the direction of movement of the carriage. This allows the seventh step print position and the first step print position to lie on a common line which extends perpendicular to the moving direction of the carriage. Likewise, each of the second step ink droplet to the sixth step ink droplet will be deflected in the same direction as the seventh step ink droplet by an amount corresponding to its specific charge. The resultant vertical dot pattern is indicated by $d_1$, $d_2'$, $d_3'$, $d_4'$, $d_5'$, $d_6'$ and $d_7'$ in FIG. 3.

With this principle, the present invention prevents distortion or inclination of characters on a paper sheet during a printing stroke of a carriage without resorting to a special electrode for exclusive use.

Figure 4A:
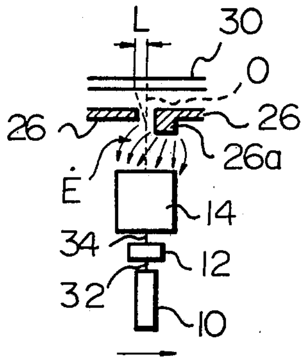
FIGS. 4*a*–13*b* are fragmentary views of various embodiments of the present invention.
Figure 4B:
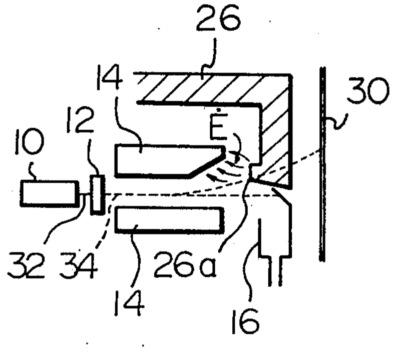
Figure 4C:
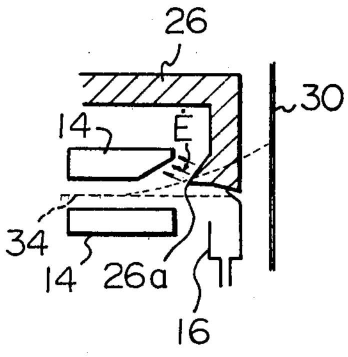

Referring to FIGS. 4*a*–4*c*, an ink jet printer embodying the present invention is illustrated in fragmentary view in which the same reference numerals as those of FIG. 1 denote the same parts and elements. As shown, a cover 26 disposed between a deflection electrode 14 and a sheet of paper 30 is formed with a lug 26*a* in its suitable portion adjacent an ink path therethrough, so that an electric field $\dot{E}$ develops asymmetrically with respect to a predetermined plane 0 in which ink droplets coming out from the charging electrode 12 are to be deflected (referred to as "deflection plane 0" hereinafter). This asymmetrical electric field $\dot{E}$ will compensate the amount of deflection of an ink droplet with the maximum charge in the opposite direction to the printing movement of the carriage 28 and by a distance L which the carriage 28 travels for a period of time from the instant of ejection of a minimum charge ink droplet to that of the maximum charge ink droplet.

Figure 5A:
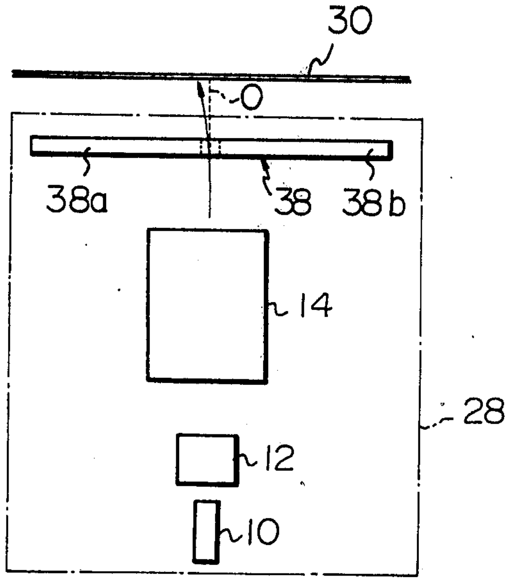
Figure 5B:
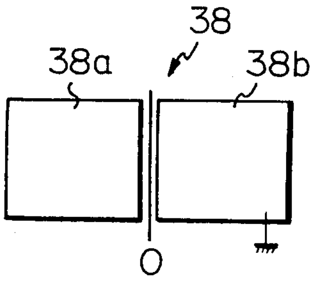
Figure 5C:
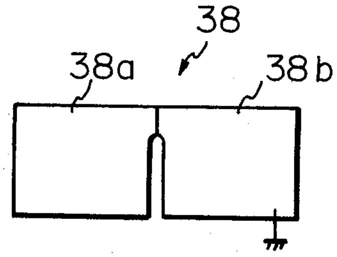
Figure 5D:
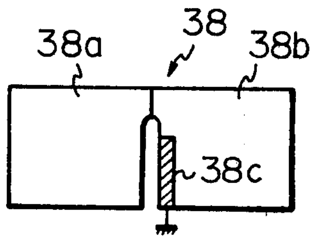
Figure 5E:
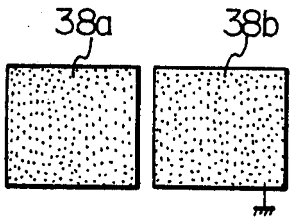
Figure 5F:
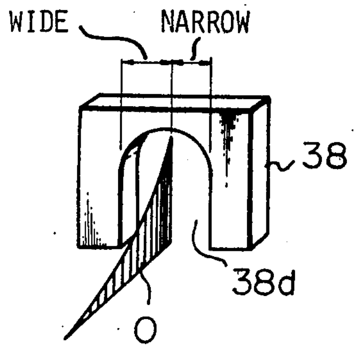
Figure 5G:
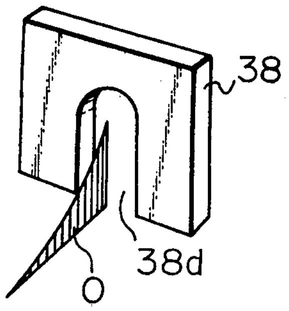

FIGS. 5*a*–5*g* illustrate in fragmentary view another embodiment of the present invention. A shield plate 38 made up of a pair of flat shield members 38*a*, 38*b* is located between the deflection electrode 14 and the paper 30. The shield members 38*a*, 38*b* are constructed electrically asymmetrical to each other with respect to the deflection plane 0 so as to prevent distortion of characters on the paper sheet 30 as in the first embodiment. In FIG. 5*b*, the shield members 38*a*, 38*b* are formed of a conductive material with the shield member 38*b* grounded. In FIG. 5*c*, the shield member 38*a* is made of an insulating material and the shield member 38*b* a conductive material while the latter is grounded. In FIG. 5*d*, both the shield members 38*a*, 38*b* are formed of an insulating material and the shield member 38*b* is locally covered with a conductive film 38*c* which is grounded. In FIG. 5*e*, each shield member 38*a*, 38*b* is made of a porous conductive material and the shield member 38*b* is grounded. Apart from the designs shown in FIGS. 5*b*–5*e*, it will readily be seen that the shield member 38*b* may be shaped to have such a conductive lug as described with reference to FIG. 4 to develop an asymmetrical electric field. It is also possible to make use of a single shield plate 38 with a slot 38*d* as shown in FIG. 5*f* or 5*g*. As seen in FIG. 5*f*, the shield plate 38 may have the slot 38*d* dimensioned asymmetrically with respect to the deflection plane 0 or, as shown in FIG. 5*g*, the shield plate 38 may be located in an inclined position relative to the deflection plane 0. All these alternatives will also set up an asymmetrical electric field for the purpose concerned.

Figure 6A:
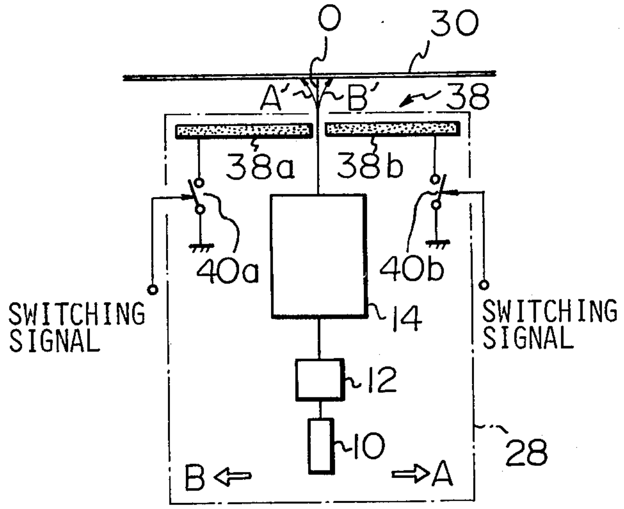
Figure 6B:
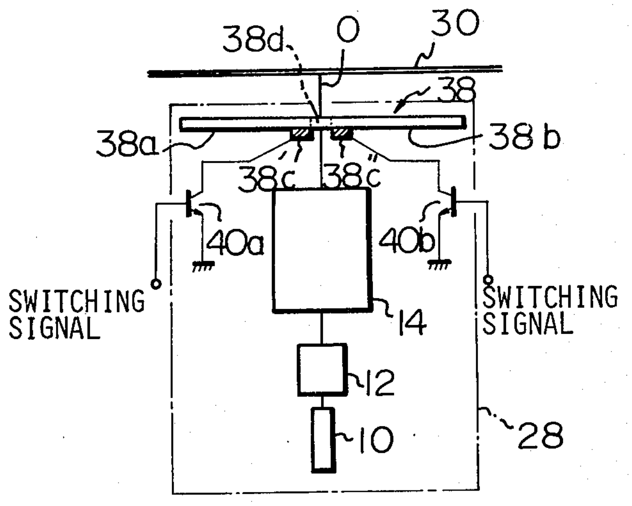
Figure 6C:
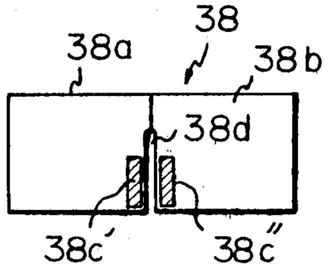

Referring to FIGS. 6*a*–6*c*, there is shown a modification to the embodiment described above in conjunction with FIGS. 5*a*–5*e*. The shield member 38*a* is connected with one stationary contact of a switch 40*a* and the shield member 38*b* with one stationary contact of a second switch 40*b*. The other stationary contact of each switch 40*a*, 40*b* is grounded. A movable contact of each switch 40*a*, 40*b* is actuated by a switching signal to selectively open and close the switch. While the carriage 28 strokes to print out data in a direction A indicated in FIG. 6*a*, the switch 40*b* is turned on to ground the shield member 28*b* to develop an electric field between the deflection electrode 14 and the shield plate 38 which is asymmetrical with respect to the deflection plane 0, thereby deflecting ink droplets to a direction A′. While the carriage 28 strokes in the opposite direction B, the switch 40*a* is turned on to ground the shield member 38*b* so that ink droplets become deflected in the opposite direction B′ under the asymmetrical electric field between the deflection electrode 14 and the shield plates 38*a*, 38*b*. In this type of arrangement, an amount of deflection of a maximum charge ink droplet caused by the asymmetrical electric field is predetermined to coincide with the distance which the carriage 28 moves from the time of ejection of a minimum charge ink droplet to that of the maximum charge ink droplet. Under this condition, the maximum charge ink droplet will impinge on the paper sheet 30 vertically above the minimum charge ink droplet and the other ink droplets each with a charge between the maximum and the minimum will be deflected in proportion to their charges to impinge on the paper sheet 30 lined up between the maximum and minimum charge ink droplets. This reproduces data on the paper sheet 30 without any distortion or inclination.

In FIGS. 6*a*–6*c* the ink droplets to be deflected are charged to the positive polarity while a lower plate of the deflection electrode 14 is held at the ground level and an upper plate at a negative high potential.

Referring to FIGS. 6*b* and 6*c*, a modification to the arrangement of FIG. 6*a* is illustrated. In the modification, the shield members 38*a*, 38*b* are made of an insulating material. Conductive members 38*c*′, 38*c*″ are carried on the individual shield members 38*a*, 38*b* at the opposite sides of the slot 38*d* through which ink droplets are to pass. The conductive members 38*c*′, 38*c*″ are selectively grounded in accordance with the direction of printing stroke of the carriage 28 as in the arrangement of FIG. 6*a*. It should be noted that the shield plates 38 can be formed of a conductive material instead of the insulating material without affecting their anti-inclination function described with reference to FIG. 6*a*, only if they are electrically disconnected from each other.

Figure 7A:
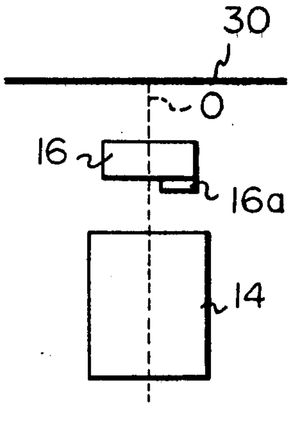
Figure 7B:
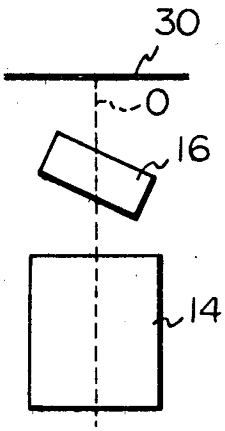

Referring to FIGS. 7*a* and 7*b*, the anti-inclination effect is achieved with the conductive gutter 16 which is positioned between the deflection electrode 14 and the paper sheet 30. In FIG. 7*a*, the gutter 16 is formed with a lug 16*a* while, in FIG. 7*b*, the gutter 16 is bodily inclined relative to the deflection plane 0. In either case, an electric field is set up between the gutter 16 and the deflection electrode 14 which is asymmetrical with respect to the deflection plane 0.

Figure 8A:
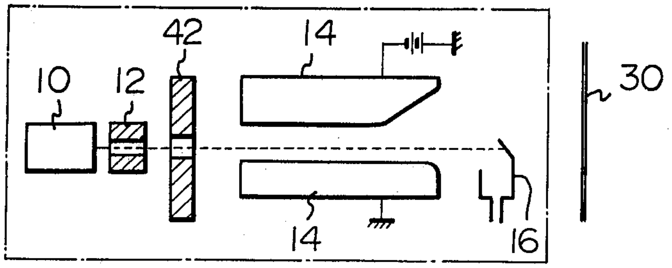
Figure 8B:
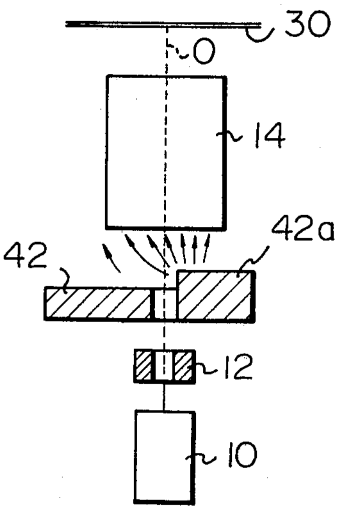
Figure 8C:
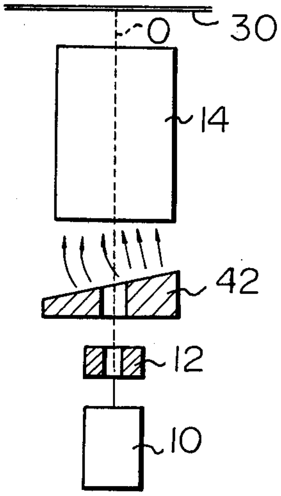

Referring to FIGS. 8*a*–8*c*, there is shown another embodiment of the present invention in which a compensating electrode 42 is disposed between the charging electrode 12 and the deflection electrode 14. In this arrangement, an asymmetrical electric field with respect to the deflection plane 0 is developed between the compensating electrode 42 and the deflection electrode 14 either by forming a lug 42*a* on the electrode 42 as in FIG. 8*b* or inclining relative to the deflection plane 0 that surface of the electrode 42 which faces the electrode 14 as in FIG. 8*c*.

Where a single ink jet pinter is so operated as to selectively print out large and small characters, for example, the carriage 28 is driven at a speed which depends on the size of the characters. In such a case, simple provision of the compensating electrode 42 as in FIGS. 8a–8c cannot afford the anti-inclination effect except for either one type of characters, i.e. large or small. This problem can be settled with an alternative arrangement shown in FIG. 9.

Figure 9:
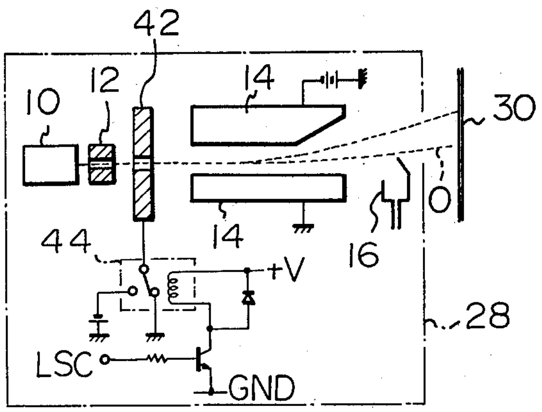

Referring to FIG. 9, the compensating electrode 42 is connected with a relay switch 44. In response to a large character signal (LCS="1"), the relay switch 44 is actuated to the illustrated position to lower the potential of the electrode 42 down to zero. This intensifies the asymmetrical electric field between the electrodes 14 and 42 thereby preventing distortion of large characters reproduced on the paper sheet 30. In response to a small character signal (LCS="0"), the relay switch 44 is turned off to supply a negative potential to the electrode 42. This weakens the asymmetrical electric field to proportionally reduce the degree of compensation, whereby small characters are reproduced on the paper sheet 30 without any distortion. Thus, the arrangement shown in FIG. 9 succeeds in printing out both large and small letters without distortion despite the simplicity of construction.

Figure 10A:
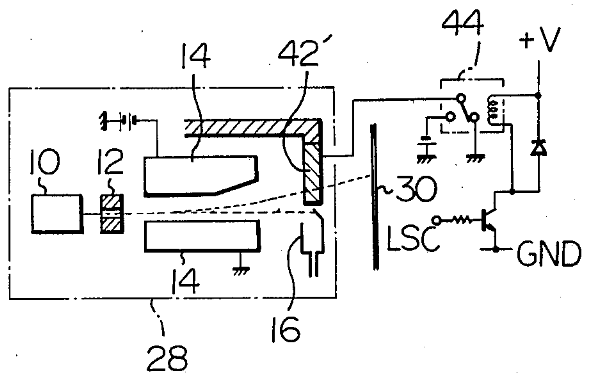
Figure 10B:
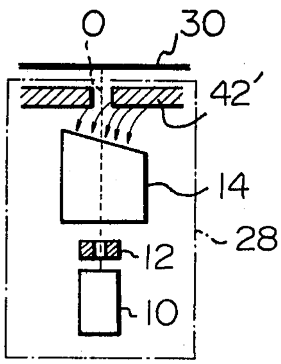
Figure 10C:
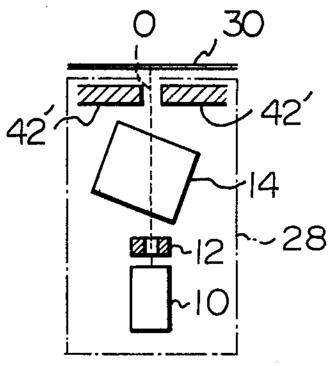

Another embodiment of the present invention is shown in FIGS. 10a–10e, in which parts and elements equivalent in function to those of FIG. 9 are denoted by the same reference numerals. As shown, a compensating electrode 42' is interposed between the deflection electrode 14 and the paper sheet 30. In FIG. 10b, that surface of the deflection electrode 14 which faces the compensating electrode 42' is inclined relative to the deflection plane 0. In FIG. 10c, the deflection electrode 14 is bodily inclined relative to the plane 0. In either case, an electric field between the deflection electrode 14 and the paper sheet 30 is made asymmetrical with respect to the plane 0.

Figure 10D:
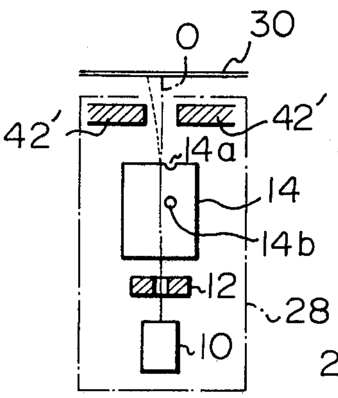
Figure 10E:
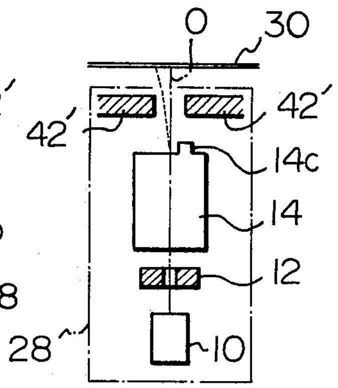

In FIG. 10d, the deflection electrode 14 is formed with a notch 14a and/or an opening 14b so that an asymmetrical electric field may be developed between the deflection electrode 14 and the compensating electrode 42'. In FIG. 10e, the deflection electrode 14 is formed with a lug 14c to develop an asymmetrical electric field in the same manner.

Figure 11:
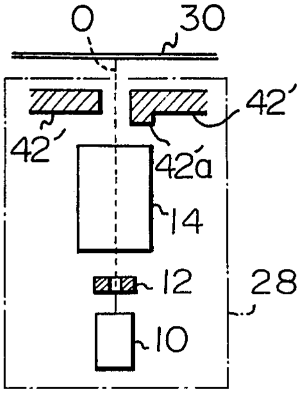

In order to set up an asymmetrical electric field between the electrodes 14 and 42', the compensating electrode 42' may be shaped to have a lug 42'a as illustrated in FIG. 11 as another embodiment of the present invention.

Figure 12A:
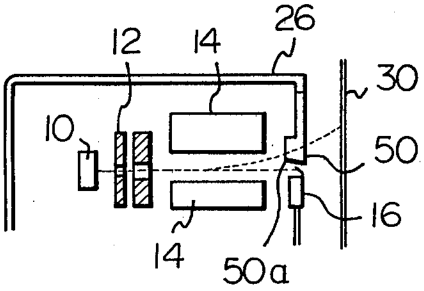
Figure 12B:
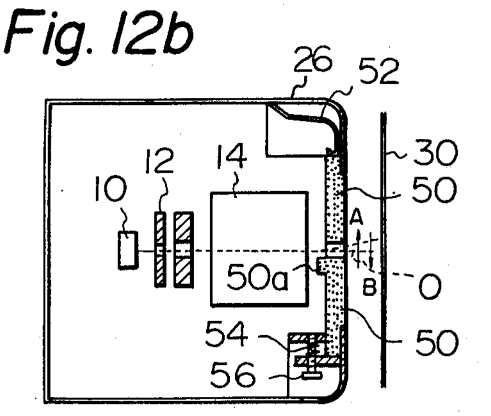

Referring to FIGS. 12a and 12b, still another embodiment of the present invention is shown which is designed to render the asymmetric electric field adjustable. A shield electrode 50 forms a part of the cover 26 of the printer. The cover and shield electrode 50 is constantly biased by a leaf spring 52 disposed inside the cover 26. Denoted by the reference numeral 56 is an adjusting screw around which a coil spring 54 is wound. The cover and shield electrode 50 (or the cover 26 or the shield electrode 38) is movable in a direction A or a direction B through the adjusting screw 56 to adjust the intensity of the asymmetrical electric field between the deflection electrode 14 and the cover and shield electrode 50. This permits characters to be printed out with an adjustable inclination or without any inclination as desired.

Figure 13A:
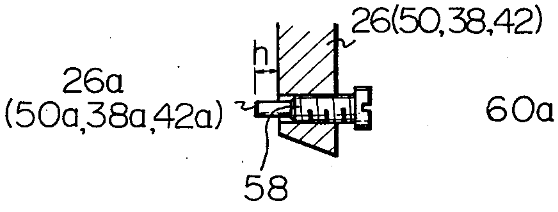
Figure 13B:
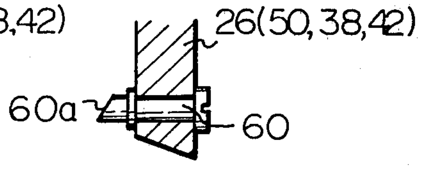

Alternative implements for the adjustment of the asymmetrical electric field are illustrated in FIGS. 13a and 13b. In FIG. 13a, a screw 58 is threadedly engaged with the cover 26 (or the cover and shield electrode 50, the shield plate 38 or the compensating electrode 42). With this screw 58, the amount of projection h of the screw 58 or that of the lug 26a, 50a or the like is adjustable to control the intensity of the asymmetrical electric field concerned. In FIG. 13b, a member 60 whose tip 60a is angularly cut is rotatably passed through the cover 26 (or the cover and shield electrode 50 or the shield plate 38) and locked in position under a friction larger than predetermined one. The member 60 and, therefore, its tip 60a is rotatable to adjust the intensity of the asymmetrical electric field to a desired degree.

In summary, it will be seen that the present invention effectively compensates an inclination or distortion of characters due to a printing stroke of a carriage by means of a simple and economical construction. The compensation is performed adequately for both large and small characters.

Various modifications will become possible for those skilled in the art after receiving the teachings of the present disclosure without departing from the scope thereof.

What is claimed is:

1. An ink jet printing apparatus comprising:
   - an ink ejection head for ejecting a jet of ink;
   - charging electrode means for electrostatically and selectively charging ink droplets separated from the ink jet;
   - deflection electrode means for electrostatically deflecting the charged ink jet;
   - a carriage for mounting thereon the ink ejection head, the charging means and the deflection means and moving reciprocatingly along a sheet of paper; and
   - a means for subjecting the charged ink droplets to an electric field which is asymmetrical with respect to a predetermined deflection plane in which the charged ink droplets coming out from the charging electrode means are to be deflected;
   - the asymmetrical electric field applying means being disposed between the charging electrode means and the deflection electrode means.

2. An ink jet printing apparatus comprising:
   - an ink ejection head for ejecting a jet of ink;
   - charging electrode means for electrostatically and selectively charging ink droplets separated from the ink jet;
   - deflection electrode means for electrostatically deflecting the charged ink jet;
   - a carriage for mounting thereon the ink ejection head, the charging means and the deflection means and moving reciprocatingly along a sheet of paper; and
   - a means for subjecting the charged ink droplets to an electric field which is asymmetrical with respect to a predetermined deflection plane in which the charged ink droplets coming out from the charging electrode means are to be deflected;
   - the asymmetrical electric field applying means being disposed between the deflection electrode means and a sheet of paper;
   - the asymmetrical electric field applying means comprising a wall of a cover or housing of the carriage which faces the sheet of paper and formed with a slot for the passage of the ink droplets, one of opposite portions of the wall with respect to the deflection plane in which the ink droplets fly through said slot being shaped asymmetrical to the other portion.

3. An apparatus as claimed in claim 2, in which said one wall portion is provided with a lug.

4. An ink jet printing apparatus comprising:
an ink ejection head for ejecting a jet of ink;
charging electrode means for electrostatically and selectively charging ink droplets separated from the ink jet;
deflection electrode means for electrostatically deflecting the charged ink jet;
a carriage for mounting thereon the ink ejection head, the charging means and the deflection means and moving reciprocatingly along a sheet of paper; and
a means for subjecting the charged ink droplets to an electric field which is asymmetrical with respect to a predetermined deflection plane in which the charged ink droplets coming out from the charging electrode means are to be deflected;
the asymmetrical electric field applying means being disposed between the deflection electrode means and a sheet of paper; the asymmetrical electric field applying means comprising two flat shield members which face the sheet of paper and located in register with each other at opposite sides of the deflection plane.

5. An apparatus as claimed in claim 4, in which both the shield members are made of a conductive material and one of the conductive shield members is grounded.

6. An apparatus as claimed in claim 4, in which one of the shield members is made of an insulating material and the other of a conductive material, the conductive shield member being grounded.

7. An apparatus as claimed in claim 4, in which both the shield members are formed of an insulating material, one of the shield members being provided with a conductive film thereon which is grounded.

8. An apparatus as claimed in claim 4, in which both the shield members are formed of a porous conductive material, one of the shield members being grounded.

9. An apparatus as claimed in claim 4, in which both the shield members are made of a conductive material and each of the shield members is selectively switched to the ground in accordance with a direction of printing stroke of the carriage.

10. An apparatus as claimed in claim 4, in which both the shield members are made of an insulating material and individually provided thereon with conductive members adjacent the deflection plane, said conductive members being selectively switched to the ground in accordance with a direction of printing stroke of the carriage.

11. An ink jet printing apparatus comprising:
an ink ejection head for ejecting a jet of ink;
charging electrode means for electrostatically and selectively charging ink droplets separated from the ink jet;
deflection electrode means for electrostatically deflecting the charged ink jet;
a carriage for mounting thereon the ink ejection head, the charging means and the deflection means and moving reciprocatingly along a sheet of paper; and
a means for subjecting the charged ink droplets to an electric field which is asymmetrical with respect to a predetermined deflection plane in which the charged ink droplets coming out from the charging electrode means are to be deflected;
the asymmetrical electric field applying means being disposed between the deflection electrode means and a sheet of paper;
the asymmetrical electric field applying means comprising a conductive shield plate which is opposed by the paper sheet and formed with a slot for the passage of the ink droplets, said shield plate being positioned to locate the slot asymmetrical with respect to the deflection plane.

12. An apparatus as claimed in claim 11, in which the shield plate is displaced in a direction perpendicular to the deflection plane to a position where the slot becomes asymmetrical with respect to said plane.

13. An apparatus as claimed in claim 11, in which the shield plate is displaced obliquely relative to the deflection plane to a position where the slot becomes asymmetrical with respect to the deflection plane.

14. An ink jet printing apparatus comprising:
an ink ejection head for ejecting a jet of ink;
charging electrode means for electrostatically and selectively charging ink droplets separated from the ink jet;
deflection electrode means for electrostatically deflecting the charged ink jet;
a carriage for mounting thereon the ink ejection head, the charging means and the deflection means and moving reciprocatingly along a sheet of paper; and
a means for subjecting the charged ink droplets to an electric field which is asymmetrical with respect to a predetermined deflection plane in which the charged ink droplets coming out from the charging electrode means are to be deflected;
the asymmetrical electric field applying means being disposed between the deflection electrode means and a sheet of paper; and
a conductive gutter, the asymmetrical electric field applying means being constituted by said conductive gutter, the conductive gutter being shaped such that one of two sides thereof facing each other at both sides of the deflection plane be asymmetrical to the other side.

15. An apparatus as claimed in claim 14, in which said one side of the conductive gutter is formed with a lug.

16. An ink jet printing apparatus comprising:
an ink ejection head for ejecting a jet of ink;
charging electrode means for electrostatically and selectively charging ink droplets separated from the ink jet;
deflection electrode means for electrostatically deflecting the charged ink jet;
a carriage for mounting thereon the ink ejection head, the charging means and the deflection means and moving reciprocatingly along a sheet of paper; and
a means for subjecting the charged ink droplets to an electric field which is asymmetrical with respect to a predetermined deflection plane in which the charged ink droplets coming out from the charging electrode means are to be deflected;
the asymmetrical electric field applying means being disposed between the deflection electrode means and a sheet of paper; and
a conductive gutter, the asymmetrical electric field applying means being constituted by said conductive gutter, the conductive gutter being located asymmetrical with respect to the deflection plane.

17. An ink jet printing apparatus comprising:
an ink ejection head for ejecting a jet of ink;

charging electrode means for electrostatically and selectively charging ink droplets separated from the ink jet;

deflection electrode means for electrostatically deflecting the charged ink jet;

a carriage for mounting thereon the ink ejection head, the charging means and the deflection means and moving reciprocatingly along a sheet of paper; and a means for subjecting the charged ink droplets to an electric field which is asymmetrical with respect to a predetermined deflection plane in which the charged ink droplets coming out from the charging electrode means are to be deflected;

the asymmetrical electric field applying means being disposed between the charging electrode means and the deflection electrode means;

the asymmetrical electric field applying means comprising a compensating electrode plate which is formed with a slot for the passage of the ink droplets, the facing sides of the slot located at opposite sides of the deflection plane being formed asymmetrical to each other.

18. An apparatus as claimed in claim 17 in which one of the facing sides of the slot is formed with a lug.

19. An apparatus as claimed in claim 17 in which the compensating electrode plate is different in thickness at the facing sides of the slot.

20. An apparatus as claimed in claim 17 in which the compensating electrode plate is impressed with a voltage which is variable in accordance with input print data.

21. An ink jet printing apparatus comprising:

an ink ejection head for ejecting a jet of ink;

charging electrode means for electrostatically and selectively charging ink droplets separated from the ink jet;

deflection electrode means for electrostatically deflecting the charged ink jet;

a carrage for mounting thereon the ink ejection head, the charging means and the deflection means and moving recirocatingly along a sheet of paper; and a means for subjecting the charged ink droplets to an electric field which is asymmetrical with respect to a predetermined deflection plane in which the charged ink droplets coming out from the charging electrode means are to be deflected;

the asymmetrical electric field applying means being disposed between the deflection electrode means and a sheet of paper;

the asymmetrical electric field applying means comprising a compensating electrode plate which is formed with a slot for the passage of the ink droplets, the facing sides of the slot located at opposite sides of the deflection plane being formed asymmetrical to each other.

22. An apparatus as claimed in claim 21, in which one of the facing sides of the slot is formed with a lug.

23. An apparatus as claimed in claim 21, in which the compensating electrode plate is impressed with a voltage which is variable in accordance with input print data.

24. An ink jet printing apparatus comprising:

an ink ejection head for ejecting a jet of ink;

charging electrode means for electrostatically and selectively charging ink droplets separated from the ink jet;

deflection electrode means for electrostatically deflecting the charged ink jet;

a carriage for mounting thereon the ink ejection head, the charging means and the deflection means and moving reciprocatingly along a sheet of paper; and a means for subjecting the charged ink droplets to an electric field which is asymmetrical with respect to a predetermined deflection plane in which the charged ink droplets coming out from the charging electrode means are to be deflected;

the asymmetrical electric field applying means being disposed between the deflection electrode means and a sheet of paper;

the asymmetrical electric field applying means comprising the deflection electrode means, the deflection electrode means being shaped asymmetrical at opposite portions thereof with respect to the deflection plane.

25. An apparatus as claimed in claim 24, in which a lug is formed on one of opposite portions of the deflection electrode means with respect to the deflection plane.

26. An apparatus as claimed in claim 24, in which a notch is formed in one of opposite portions of the deflection electrode means with respect to the deflection plane.

27. An apparatus as claimed in claim 26, in which either one of the opposite portions of the deflection electrode means is further formed with an opening.

28. An ink jet printing apparatus comprising:

an ink ejection head for ejecting a jet of ink;

charging electrode means for electrostatically and selectively charging ink droplets separated from the ink jet;

deflection electrode means for electrostatically deflecting the charged ink jet;

a carriage for mounting thereon the ink ejection head, the charging means and the deflection means and moving reciprocatingly along a sheet of paper; and a means for subjecting the charged ink droplets to an electric field which is asymmetrical with respect to a predetermined deflection plane in which the charged ink droplets coming out from the charging electrode means are to be deflected;

the asymmetrical electric field applying means being disposed between the deflection electrode means and a sheet of paper;

the asymmetrical electric field applying means comprising the deflection electrode means, the deflection electrode means being located to be asymmetrical with respect to the deflection plane;

the compensating electrode plate being impressed with a voltage which is variable in accordance with input print data.

29. An ink jet printing apparatus comprising:

an ink ejection head for ejecting a jet of ink;

charging electrode means for electrostatically and selectively charging ink droplets separated from the ink jet;

deflection electrode means for electrostatically deflecting the charged ink jet;

a carriage for mounting thereon the ink ejection head, the charging means and the deflection means and moving reciprocatingly along a sheet of paper; and a means for subjecting the charged ink droplets to an electric field which is asymmetrical with respect to a predetermined deflection plane in which the charged ink droplets coming out from the charging electrode means are to be deflected;

the asymmetrical electric field applying means being disposed between the deflection electrode means and a sheet of paper;

the asymmetrical electric field applying means comprising two flat shield members which face the sheet of paper and located in register with each other at opposite sides of the deflection plane;

the asymmetrical field applying means including a means for adjusting the asymmetrical electric field.

30. An apparatus as claimed in claim 29, in which the adjusting means consists of a means for moving the shield plate in a direction perpendicular to the deflection plane.

31. An apparatus as claimed in claim 29, in which the adjusting means comprises an adjusting screw having a tip portion which projects toward the deflection plane.

32. An apparatus as claimed in claim 31, in which the end of the tip portion of the adjusting screw is cut angularly.

* * * * *